Patented Oct. 14, 1952

2,614,039

UNITED STATES PATENT OFFICE 2,614,039

COMPOSITION FOR AND METHODS OF PRESERVING THE FRESHNESS OF BOTANICAL PRODUCTS AFTER SEVERANCE THEREOF FROM LIVING PLANTS

Charles L. Hamner, East Lansing, Mich., assignor to The B. F. Goodrich Company, New York, N. Y., a corporation of New York No Drawing. Application October 15, 1949, Serial No. 121,641

8 Claims. (Cl. 71—2.7)

This invention relates to the art of preserving the freshness of botanical products after severance thereof from living plants and pertains particularly to compositions for, and methods of treating cut flowers, harvested fruits and the like in such a manner that the tissues thereof are permeated by certain organic chemicals which seem to function therein to retard the normal biological maturing processes. In an especially important embodiment, the invention relates to the use of N-hydroxyalkyl amino acids to extend the life and preserve the beauty and fragrance of cut roses and other cut flowers.

When flowers and fruits are severed from the living plants on which they have developed, various physical, chemical and biological processes occur therein, depending, of course, on the nature of the new environment. For example, when a rose bud is plucked and kept apart from a source of water, it rapidly wilts and dies due largely to excessive transpiration, i. e. the loss of water initially present in its tissues. When the rose bud is placed in water the transpiration is partially restrained so that the rose bud soon opens to form the full flower. In a relatively short time, however, the rose changes in color, loses its fragrance, sheds its petals and finally dies, these changes being thought to be due to several factors in addition to transpiration, including depletion of food reserves, the action of microorganisms such as enzymes, bacteria and fungi, and changes in pH of the cell fluids. Consequently it has been proposed to keep cut roses and other cut flowers in an aqueous medium whose pH is adjusted to that of the cell fluids in the living plant and which contains a nutrient to supply reserve food elements and an antiseptic to counteract decomposition resulting from the action of microorganisms.

Although the use of such a preserving medium has generally produced advantages over the use of water alone, the problem of retaining cut flowers in their natural state of beauty and fragrance for a period as long or longer than would be the case if the flowers were left on the living plant, has not thereby been solved. Rose buds kept in such a medium open substantially as fast as when kept in water, and, after opening, the rose petals tend to fade and lose their natural color in a relatively short time. All in all, it seems that the supply of water, food elements, antiseptics and regulation of pH, serves to prevent the sudden death of the cut flower due to transpiration, starvation or external influences, but does not substantially retard the normal maturing processes hastened by severance from the plant.

I have now discovered that the extraneous addition of certain amino acids to the cells and tissues of cut flowers seems actually to retard the normal biological maturing processes to a remarkable degree in that the flowers remain in the state of development at which they were severed and retain their life and freshness, as evidenced by stability of color and retention of fragrance, through this and any subsequent states for a much longer period of time than has heretofore been possible. Accordingly, my invention resides in various methods involving the use of such amino acids for this purpose and in various compositions containing such amino acids particularly adapted to be so used.

The amino acids which are employed in my invention are, in general, water-soluble amino acids having a hydroxyalkyl substituent on the nitrogen atom of the amino group. Structurally, they possess the formula

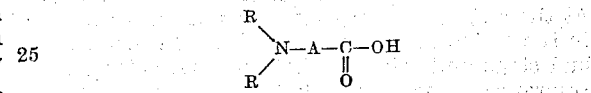

wherein at least one R is a hydroxyalkyl radical preferably a hydroxymethyl, hydroxyethyl, hydroxypropyl or hydroxybutyl radical; any R which is not hydroxyalkyl is hydrogen and A is a divalent hydrocarbon radical, preferably containing from 1 to 8 carbon atoms and preferably being an alkylidene radical such as methylene, ethylidene, propylidene etc. or an alkylene radical such as ethylene, propylene, butylene, pentamethylene, etc. Specific amino acids of the above general class are N-(2-hydroxyethyl)-beta-alanine, and N,N-di-(2-hydroxyethyl)-beta-alanine, which are the presently preferred amino acids for use in this invention because of their ease of preparation and availability and the overall excellency of the results obtained therewith. Other specific amino acids utilizable in this invention are N-(2-hydroxyethyl)-glycine; N,N-di-(2-hydroxyethyl)-glycine; N-(hydroxymethyl)-glycine; N-(1-hydroxypropyl)-glycine; 4-(2-hydroxypropyl)-beta-alanine; N-(1-hydroxyethyl)-alpha-alanine; N-(4-hydroxypentyl)-alpha-amino-butyric acid; N,N-di-(2-hydroxyethyl)-isovaline; N-(2-hydroxyethyl) beta-amino-butyric acid; N-(2-hydroxyethyl)-alpha-amino-beta-beta-dimethyl-butyric acid; N-(2-hydroxyethyl)-delta-amino-caproic acid; N-(2-hydroxyethyl)-beta-phenyl-alpha-amino propionic acid and the like. Instead of the free amino acid, it is also possible to employ water-soluble salts thereof, particularly when the amino acid is used with an acid substance which converts the amino acid salt into the free amino acid.

One method of employing these amino acids in preserving the freshness of cut flowers consists simply in dissolving a small amount of the amino acid in water, and then maintaining the stems or other permeable portions of the cut flowers in contact with the resulting aqueous solution. The cells and tissues of the flower thus become permeated with the amino acid solution and the flower retains its freshness for considerable periods of time. When using this method to preserve roses, it has been found most desirable to employ aqueous solutions containing only from about 0.1 to 1% by weight of the amino acid, that is, from about 1 to 10 grams of amino acid per liter of water, the optimum concentration being from 2 to 6 grams of amino acid per liter of water.

The following specific example illustrates the use of an aqueous solution of amino acid in preserving the freshness of rose buds and in holding the roses in the loose bud stage.

*Example I*

Freshly picked rose buds of the Better Times variety were stored overnight in a cold water solution (that is, they were "hardened off," as is the practice in greenhouses), were then placed in an aqueous solution containing 5 grams of N-(2-hydroxyethyl)-beta-alanine to 1000 grams of water, and kept there without further attention for a period of five days during which time the room temperature varied in the range of about 70 to 80° F. and the relative humidity in the range of about 30 to 50%. In a control experiment, rose buds of the same variety and in the same state of development were treated in the same way except that no amino acid was present in the water in which they were kept. At the end of the five-day period the roses kept in the amino acid solution were still in the loose bud stage and retained their original color and fragrance. The rose buds kept in water, however, had opened, the petals had fallen off and had become discolored, and the beauty and fragrance of the rose had been completely lost.

Substantially the same results are obtained when the example is repeated with various other varieties of roses; with other N-hydroxyalkyl amino acids and with concentrations in the range of 1 to 10 grams of the amino acid to 1000 grams of water. When the cold water in which the roses were "hardened off" contained 1 gram of the amino acid to 1000 grams of water, even better results in retaining the roses in the bud stage were obtained.

The above example illustrates the remarkable effectiveness of the amino acids of this invention in preserving the freshness of cut flowers when used in aqueous solutions with no other substances present. Considerably better results are obtained when the aqueous solution contains not only the amino acid, but one or more other substances which beneficiate the cut flowers, including nutrients which serve to supply reserve food elements to the cells and tissues; antiseptics which serve to prevent development of mold or other injurious effects deleterious to the healthy condition of the flowers and brought on by the activity of enzymes, bacteria and fungi; and acid-reacting substances which serve to impart to the solution a pH in the range of about 4 to 6 and thereby to produce in the solution pH conditions the same as those in the cell fluids of the flowering plants. It is understood, of course, that in some instances one substance may perform more than one of these functions; the amino acids, however, are believed to perform functions and exert effects quite different from those produced by any such other substances since they are not particularly effective as plant nutrients, they do not possess antiseptic value to any significant degree and their solutions are generally neutral or substantially so rather than in the range of pH of 4 to 6. Accordingly by the use of both an amino acid and an additional substance beneficiating cut flowers, I am able to produce novel combined effects in preserving cut flowers, not possible when using such additional substances or the amino acid alone.

A wide variety of substances beneficiating cut flowers can be used advantageously in the composition of this invention along with the amino acids set forth above. Such substances must of course, be chemically inert to the amino acid on storage of the composition and in aqueous solution. However, substances which convert amino acid salts into the free acids may be used, in which case it may be desirable to use the amino acid in the form of a salt. A preferred class of such substances embraces water-soluble solid organic nutrients, particularly sugars such as cane sugar, or sucrose, or one of the simple sugars such as galactose, dextrose, levulose, mannose and the like. Other water-soluble solid organic nutrients which can be used to replace the sugar include lactic acid, asparagine, dihydroxy acetone, urea, other carbonaceous organic substances, and the like. Starches such as corn starch, etc. may also be used as organic nutrients, preferably along with materials which stimulate conversion of starch into the simpler sugar forms. Still other substances utilizable as nutrients are solid water-soluble inorganic nutrients such as potassium, ammonium and magnesium sulfates, phosphates, nitrates and chlorides, and other substances known to supply food elements to plant cells, as will be understood by those skilled in the art.

Another class of substances beneficiating cut flowers preferably used with the amino acid, and if desired, with a nutrient such as a sugar, in the compositions of this invention are the water-soluble, solid, acid-reacting substances which, as above noted, function to impart to the solution in which the flowers are kept a pH of 4 to 6. Among such substances, which may be either organic or inorganic, are ammonium, sodium or potassium aluminum sulfate, aluminum sulfate, citric acid, boric acid, tannic acid, tartaric acid, amino-ethyl sulfuric acid, sodium, ammonium or potassium acid sulfate, phosphate, sulfite, citrate, tartrate, etc., nickel chloride, zinc chloride, aluminum chloride and various other solid acid-reacting substances. If an acid alone imparts too low a pH it will, of course, be used with suitable buffering agents, such as acid salts, so as to produce the desired pH. It will also be understood that non-corrosive, non-poisonous acid substances are most conveniently employed.

In instances where the cut flower, or the medium in which it is kept, is likely to be exposed to the action of microorganisms, it is also sometimes desirable, but not essential, to include an antiseptic in the composition. The nature of the antiseptic, if any, is not critical and may be varied widely depending on the particular circumstances involved. Inorganic antiseptic salts such as the water-soluble salts of silver and copper, potassium permanganate, etc. and organic solid antiseptics such as the salts and esters of benzoic and salicylic acids, hexamethylene tetramine, oxyquinoline sulfate and various other antiseptic materials are all suitable. Still other substances beneficiating cut flowers which may be used along with the amino acids in the composition of this invention are organic silicates which serve to strengthen the tissues of cut flowers by stiffening the stems to greater rigidity and firmness.

Compositions containing the amino acid and one or more of many of the other substances hereinabove described can be made in the form of dry pulverulent solid compositions and supplied in powder or granular or tabular form. In such solid compositions, it is preferred to use from 0.1 to 10 parts of the additional solid substance for each part of the amino acid. Such compositions can then be added to water by the purchaser, preferably in such amounts as to produce a solution containing from 0.1 to 10% by weight of total dissolved materials, and used for the preservation of cut flowers by the same general method disclosed hereinabove and illustrated in Example I.

The following Examples II and VI illustrate preferred compositions of my invention:

Example II

| | Parts |
|---|---|
| N,N-di(2-hydroxyethyl)-beta-alanine | 5 to 20 |
| Sucrose | 2 to 30 |
| Aluminum potassium sulfate | 0.5 to 5 |

Example III

| | Parts |
|---|---|
| N-(2-hydroxyethyl)-beta-alanine | 1 to 8 |
| Sucrose | 1 to 10 |
| Citric acid | 0.5 to 2 |

Example IV

| | Parts |
|---|---|
| N-(2-hydroxyethyl)-beta-alanine | 1 to 10 |
| Sucrose | 1 to 60 |
| Aluminum potassium sulfate | 0.5 to 5 |

Example V

| | Parts |
|---|---|
| N,N-di(2-hydroxyethyl) glycine | 5 to 20 |
| Sucrose | 2 to 30 |
| Citric acid | 0.5 to 5 |

Example VI

| | Parts |
|---|---|
| N-(2-hydroxyethyl) beta-alanine | 4 to 8 |
| Galactose | 2 to 25 |
| Aluminum potassium sulfate | 0.5 to 5 |

Numerous experiments have demonstrated that when the compositions of Examples II to VI are dissolved in 1000 parts of water, and flowers (which preferably have just been freshly cut or which have been kept overnight in cold water) are placed therein, the flowers retain their freshness, their fresh live color, and their fragrance for periods several times as long as is possible with the use of plain water or as is possible by the use of known flower-preserving compositions not containing an amino acid. The flowers do not wilt even in warm rooms and their petals do not drop off, or their color fade, or their fragrance vanish, even after periods as long as 5 to 10 days. Most all flowers are benefited by such solutions, particularly beneficial results being secured when preserving the freshness of roses, snapdragons, gladioli, carnations, larkspur, zinnias, peonies, chrysanthemums and asters.

The compositions are also useful when treating flowers by methods other than allowing them to stand indefinitely in aqueous solutions. For example, when hardy blooms are treated by florists, etc. in a manner involving standing the stems of the freshly cut flowers in a solution of the composition described containing an amino-acid of the class described, allowing the flowers to remain in the solution only a short time, as for example 8 to 16 hours, in a surrounding temperature below about 50° F., and then, after removal from the solution, sealing the cut ends of the stems by dipping in a latex of a synthetic resin, such as Goodrite Latex VL-600, or in melted paraffin or the like, and then the flowers packaged, stored and sold, the flowers last much longer than when the same method of treatment is utilized except that the aqueous solution to which the freshly cut flowers are first exposed contains no such amino-acid. The addition of the amino acid to the synthetic resin latex or other material used to seal the ends of the flowers also enables the flowers to be kept longer.

Although the invention has been particularly described with relation to the treatment of cut flowers, other aspects of the invention are also contemplated. Harvested fruits including simple, dry, dehiscent or indehiscent fruits, fleshy fruits, aggregate fruits and collective fruits, often change undesirably after their harvesting in ways involving the hastening of maturity. This invention contemplates the retardation of such undesirable maturing processes by application of the amino-acid to the cells and tissues of the fruit as by immersing the fruit in an aqueous solution thereof or spraying the fruit with an aqueous composition, such as a synthetic resin latex, containing the amino-acid. For example, harvested sweet corn, an indehiscent fruit, may be prevented from so rapidly losing its sweetness after harvest, or strawberries, an aggregate fruit, may be prevented from so rapidly darkening in color after harvest, by treatment designed to permeate the cells and tissues with the amino-acid, thereby beneficiating the fruit without adversely affecting its fitness for human consumption, since the amino-acids of this invention in the proportions used, are completely non-toxic to man even when taken internally. Accordingly, it will be understood that, in its broadest aspects, this invention contemplates the use of the amino acids described in preserving the freshness of botanical products produced by and severed from living plants, and that the preservation of cut flowers is merely the presently preferred embodiment.

Having described my invention both broadly and in specific details, it is not intended that the invention be limtied except by the spirit and scope of the appended claims.

I claim:
1. The method of preserving the freshness of a perishable botanical product produced by and severed from a living plant which comprises applying to at least a permeable portion of said product an aqueous composition containing a water-soluble amino-acid having an unsubstituted hydroxyalkyl substituent directly linked to the nitrogen atom of the amino group.

2. The method of claim 1 wherein the amino-acid is N,N-di-(2-hydroxyethyl) beta-alanine.

3. The method of claim 1 wherein the amino-acid is N-(2-hydroxyethyl) beta-alanine.

4. The method of preserving the freshness of cut flowers which comprises placing the stems of said cut flowers in an aqueous solution containing a nutrient for supplying reserve food elements to the cells and tissues thereof and a water-soluble amino-acid having an unsubstituted hydroxyalkyl substituent directly linked to the nitrogen atom of the amino group.

5. The method of preserving the freshness of cut flowers which comprises placing the stems of said cut flowers in an aqueous solution having a pH of 4 to 6 containing from 1 to 60 parts for each 1000 parts of water of a sugar, and from 1 to 10 parts for each 1000 parts of water of N-(2-hydroxyethyl) beta-alanine.

6. A solid composition adapted to be added to water to form an aqueous solution for preserving the freshness of cut flowers and the like, said composition comprising from 1 to 10 parts of an amino-acid having an unsubstituted hydroxyalkyl substituent directly linked to the nitrogen atom of the amino group, from 1 to 60 parts of a sugar and from 0.5 to 5 parts of a solid water-soluble acid-reacting substance capable of forming in water a solution of a pH of 4 to 6.

7. A solid composition adapted to be added to water to form an aqueous solution for preserving the freshness of cut flowers and the like, said composition comprising a water-soluble amino-acid having an unsubstituted hydroxyalkyl substituent directly linked to the nitrogen atom of the amino group and a separate water-soluble, solid, organic plant nutrient.

8. A solid composition adapted to be added to water to form an aqueous solution for preserving the freshness of cut flowers and the like, said composition comprising sucrose and N-(2-hydroxyethyl) beta-alanine.

CHARLES L. HAMNER.

REFERENCES CITED

The following references are of record in the file of this patent:

UNITED STATES PATENTS

| Number | Name | Date |
|---|---|---|
| 1,978,201 | Heuer | Oct. 23, 1934 |
| 2,230,931 | Bussert | Feb. 4, 1941 |

OTHER REFERENCES

"Transplantone"—advertising leaflet, copyright 1940 by American Chemical Paint Company.